(12) United States Patent
Zieger (10) Patent No.: US 12,152,690 B2
(45) Date of Patent: Nov. 26, 2024

(54) COMBINATION VALVE

(71) Applicant: Andreas Zieger, Hofstätten an der Raab (AT)

(72) Inventor: Andreas Zieger, Hofstätten an der Raab (AT)

( * ) Notice: Subject to any disclaimer, the term of this patent is extended or adjusted under 35 U.S.C. 154(b) by 95 days.

(21) Appl. No.: 17/638,362

(22) PCT Filed: May 28, 2020

(86) PCT No.: PCT/AT2020/060215
§ 371 (c)(1),
(2) Date: Feb. 25, 2022

(87) PCT Pub. No.: WO2020/237274
PCT Pub. Date: Dec. 3, 2020

(65) Prior Publication Data
US 2022/0290770 A1 Sep. 15, 2022

(30) Foreign Application Priority Data
May 28, 2019 (AT) .................................. A 58/2019

(51) Int. Cl.
*F16K 31/40* (2006.01)
*F16K 31/06* (2006.01)
(Continued)

(52) U.S. Cl.
CPC ........ *F16K 31/408* (2013.01); *F16K 31/0651* (2013.01); *F16K 31/0655* (2013.01);
(Continued)

(58) Field of Classification Search
CPC ............................ F16K 31/408; F16K 31/0651
(Continued)

(56) References Cited

U.S. PATENT DOCUMENTS 2,964,286 A * 12/1960 Hoskins ................ F16K 31/408
251/30.04
4,848,721 A * 7/1989 Chudakov ............. F16K 31/406
137/454.6
(Continued)

FOREIGN PATENT DOCUMENTS

DE 2439271 A1 3/1976
DE 2553011 A1 6/1977
(Continued)

OTHER PUBLICATIONS

International Search Report and Written Opinion, English translation, mailed Sep. 1, 2020, from PCT/AT2020/060215 filed May 28, 2020.

*Primary Examiner* — Matthew W Jellett
(74) *Attorney, Agent, or Firm* — Workman Nydegger (57) ABSTRACT

A combination valve including an electromagnetic shut-off valve and an integrated pipe-break protection includes an inflow and an outflow, between which a first flow path is defined, a sealing surface arranged in the first flow path, a movable sealing body including a main seat and a pilot seat, between which a pilot bore is defined as a second flow path, a closing spring, an armature with a sealing surface and a magnetic coil. The sealing body closes the first flow path in the closed position by abutting the main seat against the sealing surface and closes the second flow path by abutting the sealing surface against the pilot seat. The closing spring presses the sealing surface of the armature against the pilot seat of the sealing body and the main seat of the sealing body against the sealing surface. An opening spring presses the sealing body into the open position.

9 Claims, 6 Drawing Sheets

(51) Int. Cl.
*F16K 17/30* (2006.01)
*F16K 17/34* (2006.01)
*F16K 39/02* (2006.01)

(52) U.S. Cl.
CPC .............. *F16K 17/30* (2013.01); *F16K 17/34* (2013.01); *F16K 39/024* (2013.01)

(58) Field of Classification Search
USPC ......................................... 251/30.04, 129.21
See application file for complete search history.

(56) References Cited

U.S. PATENT DOCUMENTS

| | | | | |
|---|---|---|---|---|
| 5,529,387 | A | * | 6/1996 | Mialkowski .......... F16K 31/408 251/129.21 |
| 6,142,128 | A | | 11/2000 | Gobbi |
| 6,254,200 | B1 | * | 7/2001 | Ganzel ................. F16K 31/408 303/119.2 |
| 6,293,513 | B1 | * | 9/2001 | Birkelund ............. F16K 31/408 251/30.03 |
| 6,994,308 | B1 | * | 2/2006 | Wang ........................ F16K 1/12 251/129.21 |
| 9,273,791 | B2 | * | 3/2016 | Vandamme .......... F16K 31/0655 |
| 9,366,357 | B2 | * | 6/2016 | Zieger ................. F16K 31/0651 |
| 9,970,566 | B2 | * | 5/2018 | Rovera ................. F16K 31/086 |
| 2003/0132409 | A1 | * | 7/2003 | Birkelund ............... F16K 51/02 251/30.04 |
| 2003/0151018 | A1 | * | 8/2003 | Teshima .................. F16K 25/00 251/332 |

FOREIGN PATENT DOCUMENTS

| | | |
|---|---|---|
| DE | 19533400 A1 | 5/1996 |
| DE | 19529363 A1 | 2/1997 |
| DE | 69922468 T2 | 12/2005 |
| DE | 102011076556 A1 | 11/2012 |
| DE | 102016008107 A1 | 1/2018 |
| EP | 1235012 A2 | 8/2002 |
| EP | 1533551 A1 | 5/2005 |
| JP | 2005147255 A | 6/2005 |
| WO | 9615926 A1 | 5/1996 |
| WO | 02084423 A1 | 10/2002 |

* cited by examiner

COMBINATION VALVE

The present application is a U.S. National Stage of International Application No. PCT/AT2020/060215, filed on May 28, 2020, designating the United States and claiming the priority of Austrian Patent Application No. GM 58/2019 filed with the Austrian Patent Office on May 28, 2019. All of the aforementioned applications are incorporated herein in their respective entireties by this reference.

The invention relates to a combination valve comprising an electromagnetic shut-off valve and a pipe-break protection for gases and/or liquids according to the preamble of claim 1.

Container valves for compressed gas containers for storing gaseous fuels such as, e.g., natural gas or hydrogen are designed, among other things, with an electromagnetic shut-off valve, a pipe-break protection, a manual shut-off valve, a manual drain valve and a temperature-controlled safety valve (TPRD), wherein the electromagnetic shut-off valve at least opens the removal path in the energized state or closes it in a de-energized manner, the pipe-break protection closes the access to the container when large quantities are removed such as, for example, in case of a broken pipe, the manual shut-off valve closes the access to the container during refueling and removal, the manual drain valve opens the access to the container for emergency emptying and the temperature-controlled safety valve opens an access to the container at high temperatures such as, for example, in case of a fire.

Such container valves are known, inter alia, from DE102016008107: DE102016008107 discloses a separate component for each function, i.e., the electromagnetic shut-off valve, the pipe-break protection, the manual shut-off valve, the manual drain valve and the temperature-controlled safety valve are designed as independent components with the corresponding expenditure for single-piece production and assembly. Such electromagnetic shut-off valves are known, inter alia, from EP01235012, U.S. Pat. No. 6,142,128, DE2439271 or DE19533400: EP01235012 discloses a direct switching valve, U.S. Pat. No. 6,142,128 discloses a pilot-operated valve with a connection between the armature and the sealing body, DE 24 39271 discloses a pilot-operated valve with a movable antipole, and DE19533400 discloses a pilot-operated valve with an opening spring. It is a common goal of the different constructions to open the flow path with low power consumption and to provide a certain flow cross-section with a minor pressure drop. Such mechanical pipe-break protections are known, inter alia, from EP1533551 or WO02/084423 and are composed of a closure body and a hold-open spring which, during normal operation, keeps the closure body in the opened position against the pressure drop that occurs during the flow passing through and/or around as a result of a flow deflection, but automatically closes the flow path at a fixed flow rate at which the closing force is greater than the opening force of the hold-open spring as a result of the pressure drop during the flow passing through and/or around.

Such electrified pipe-break protections are known, inter alia, from DE2553011A1 or JP2005147255A and are composed of a closure body, an opening spring and an electromagnet for influencing the position of the closure body.

It is an object of the invention to create a combination valve that combines the electromagnetic shut-off valve and the mechanical pipe-break protection with reliable individual functions in a simple design and on a small installation space in one assembly.

The object is achieved by a combination valve comprising an electromagnetic shut-off valve and a pipe-break protection integrated into the electromagnetic shut-off valve and having the features of claim 1.

The combination valve according to the invention is designed as an indirectly controlled electromagnetic valve and comprises an inflow and an outflow, between which a first flow path is defined, a sealing surface arranged in the first flow path, a sealing body movable between an open position and a closed position and comprising a main seat and a pilot seat, between which a pilot bore is defined as a second flow path, a closing spring, an armature with a sealing surface and a magnetic coil. The sealing body is designed for closing the first flow path in the closed position by abutting the main seat against the sealing surface and for closing the second flow path by abutting the sealing surface against the pilot seat. In the open position, the main seat is spaced from the sealing surface. The armature is arranged between the closing spring and the sealing body, and the closing spring is designed for pressing the sealing surface of the armature against the pilot seat of the sealing body and the main seat of the sealing body against the sealing surface by means of a spring force. The magnetic coil is designed for attracting the armature against the spring force of the closing spring. The combination valve comprises an opening spring which is designed for pressing the sealing body into the open position by means of a spring force, the closing spring having a higher spring force than the opening spring. Parts of the electromagnetic shut-off valve which are located in the first flow path are shaped in such a way that they generate a flow deflection and/or flow acceleration of the medium flowing therein and, as a result, a pressure drop from the inflow to the outflow. The spring force of the opening spring is adjusted in such a way that the pressure drop at a fixed flow rate of the medium in the first flow path pushes the sealing body against the spring force of the opening spring from the open position into the closed position, with the second flow path being opened in the closed position when the armature is attracted.

Due to this configuration of the combination valve according to the invention, on the one hand, an indirectly controlled electromagnetic valve is created and, on the other hand, both a pipe-break protection and a reset function of the pipe-break protection are implemented.

The initially mentioned electrified pipe-break protections are direct switching valves, i.e., there is only one flow path from the inflow side to the outflow side with one valve seat. The position of the armature directly influences the position of the sealing body. Some of the initially mentioned valves have mechanical pipe-break protections which, by adding an electromagnet, can be brought into an operating position with an operable pipe-break protection and/or into a closure position with a closed, i.e., triggered, pipe-break protection. The sealing body of some of the known valves cannot return to the open position on its own after the pipe-break protection has been activated, i.e., after the flow path has been closed as a result of a pressure drop and after a pipe burst has been repaired, since, upon closure of the flow path, medium can no longer flow from the inflow to the outflow and, consequently, the differential pressure at the sealing body cannot be reduced. Only the electromagnet or a pressure applied on the outflow side can move the sealing body into the open position, partly while being supported by an opening spring.

A directly switching valve has a very simple structure and is used with small valve sizes and/or with minor pressure differences. The space requirement and the electrical power consumption of a directly switching valve increase with the valve size and the differential pressure so that indirectly switching valves are used without exception at higher pressures. In case of an indirectly switching valve, the electromagnet does not open the first flow path, but at first a second flow path with a very small valve size and thus a low electrical power consumption (and overall size). According to the invention, medium can flow from the inflow to the outflow via the second flow path (i.e., the pilot bore of the sealing body) in the opened state of the valve (i.e., when the magnetic coil is energized) and can compensate for an existing pressure difference at the sealing body. In case of a pressure difference (that is almost compensated for), the main seat can subsequently be opened, wherein this opening process can be effected by the armature or by a spring or by a differential pressure.

The pipe-break protection has the function of closing the flow path in the event of a component (e.g., a pipe) located downstream of the valve seat in the flow direction breaking so that medium can no longer flow out of the upstream container. The pressure difference between the inflow and the outflow (this is the ambient pressure in case of a pipe burst) presses the sealing body onto the valve seat and ensures adequate tightness. For emptying the container after the pipe-break protection has been activated, in case of a mechanical pipe-break protection the damaged area must first be repaired and then the pressure must be increased from the outflow side until the mechanical pipe-break protection is opened again by the opening spring shortly before pressure equivalence between the outflow and the inflow is achieved (this process is referred to as "restoring" or "resetting"). The mechanical pipe-break protection responds to every pressure drop, among other things also to a strong acceleration of the flow, as it occurs frequently in a tank system for a motor vehicle. The resetting process is very complex and not feasible for the operator of a motor vehicle.

The present invention basically provides an electromagnetic valve in which a mechanical pipe-break protection is additionally installed. This valve is intended for high-pressure applications, which is why only an indirectly switching valve comes into consideration because of the overall size. An indirectly switching valve with an opening spring has been chosen for the invention, wherein the (normally undesirable) pressure drop during the flow-through in the closing direction is increased by a suitable deflection and/or flow-through. Since the indirectly switching valve has a small bore for pressure compensation via the pilot bore, this existing bore can be used for resetting. In the indirectly switching electromagnetic valve according to the invention with a spring pilot control, the function of the pipe-break protection could be incorporated without any additional expenditure on equipment only by synchronizing the opening force of the spring with the closing force of the pressure drop generated during the flow-through in such a way that the valve closes at a certain flow value (and, associated therewith, a certain pressure drop). No additional components or sealing surfaces that are difficult to handle are required.

The first flow path preferably runs along the sealing body and optionally through the armature and/or the opening spring.

If the pilot bore has sections of different diameters, the advantage of an easily adjustable flow-through and a weight reduction arises if the greater part of the pilot bore has a large diameter and only a short section has the small diameter that is required for adjusting the flow-through.

In a preferred embodiment of the combination valve according to the invention, a section of the second flow path is formed through a clearance between the sealing body and a housing of the electromagnetic shut-off valve surrounding the sealing body, or through a groove extending on the outside of the sealing body, or through a bore extending inside the sealing body.

For generating/increasing the pressure drop from the inflow to the outflow, the sealing body can be provided with a pressure drop area which is arranged in the first flow path and around and/or through which the flow passes.

In another embodiment of the combination valve according to the invention, for generating/increasing the pressure drop from the inflow to the outflow, the armature is provided with a pressure drop area which is arranged in the first flow path and around and/or through which the flow passes.

In yet another embodiment of the combination valve according to the invention, the opening spring is arranged in the first flow path and is designed for generating a pressure drop. The pressure drop from the inflow to the outflow is increased also by this embodiment of the invention.

In a further embodiment of the combination valve according to the invention, a section of the first flow path is defined by the housing of the electromagnetic shut-off valve and/or by a container valve housing, wherein preferably the section of the first flow path is shaped in such a way that it generates a pressure drop from the inflow to the outflow.

In a preferred embodiment of the combination valve according to the invention, the opening spring is an elastic component made of metal, polymer or elastomer or a resilient section on the sealing body. Those designs are advantageous due to high functional reliability and low production costs, particularly when the resilient section is formed on the sealing body.

Further features and advantages of the invention become apparent from the following description of possible embodiments and on the basis of the drawings.

Figure 1:
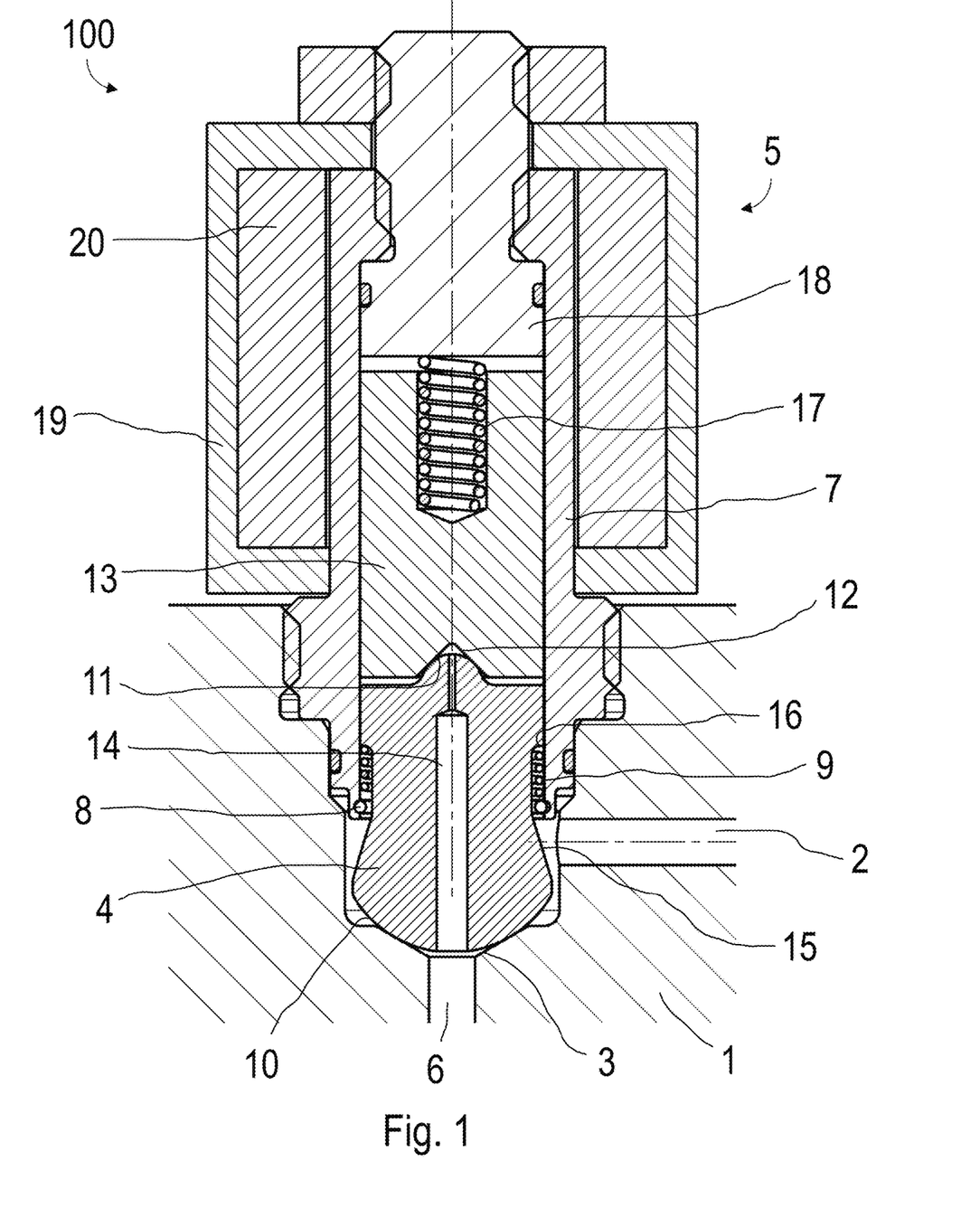
FIG. 1 shows a possible embodiment of the combination valve in the closed state.

FIG. 1 shows a possible embodiment of the combination valve (100) as a screw fitting with a pressure-bearing housing in the closed state in a cutout of a container valve housing (1) including an inflow (2) for supplying the gas from a storage container, a sealing surface (3) for sealing against the sealing body (4) of the electromagnetic shut-off valve (5) and an outflow (6) for discharging the gas. Furthermore, an electromagnetic shut-off valve (5) with a pressure-bearing housing (7) including a spring support (8) for supporting the opening spring (9), an opening spring (9) for lifting the sealing body (4) from the housing (1) when there are suitable pressure conditions on the sealing body (4), an axially movable sealing body (4) including a main seat (10) for sealing against the sealing surface (3) in the housing (1), a pilot seat (11) for sealing against a sealing surface (12) on the armature (13) with a pilot bore (14) as an internal connection between the pilot seat (11) and the main seat (10), a pressure drop area (15) as a flow limiter for generating a pressure drop during the flow-through from the inflow (2) to the outflow (6), with the flow passing around said area, and a spring support (16) for supporting the opening spring (9), and an axially movable armature (13) with a sealing surface (12) for sealing against the pilot seat (11), a closing spring (17) for closing the electromagnetic shut-off valve (5) in the de-energized state, an immobile antipole (18) as a counterpart to the armature (13), a magnetic yoke (19) for closing the magnetic circuit and a magnetic coil (20) for generating the electromagnetic field.

According to FIG. 1, in the closed state with the magnetic coil (20) being de-energized, the closing spring (17) presses the armature (13) with its sealing surface (12) against the pilot seat (11) of the sealing body (4) against the force of the opening spring (9) and thus presses the sealing body (4) with its main seat (10) against the sealing surface (3) of the housing (1), thus closing the two flow paths between the inflow (2) and the outflow (6), i.e., closing the first flow path between the main seat (10) of the sealing body (4) and the sealing surface (3) of the housing (1) and the second flow path via the pilot bore (14) between the pilot seat (11) of the sealing body (4) and the sealing surface (12) of the armature (13). The sealing effect is thereby improved by the differential pressure on the sealing body (4) and the armature (13).

Figure 2:
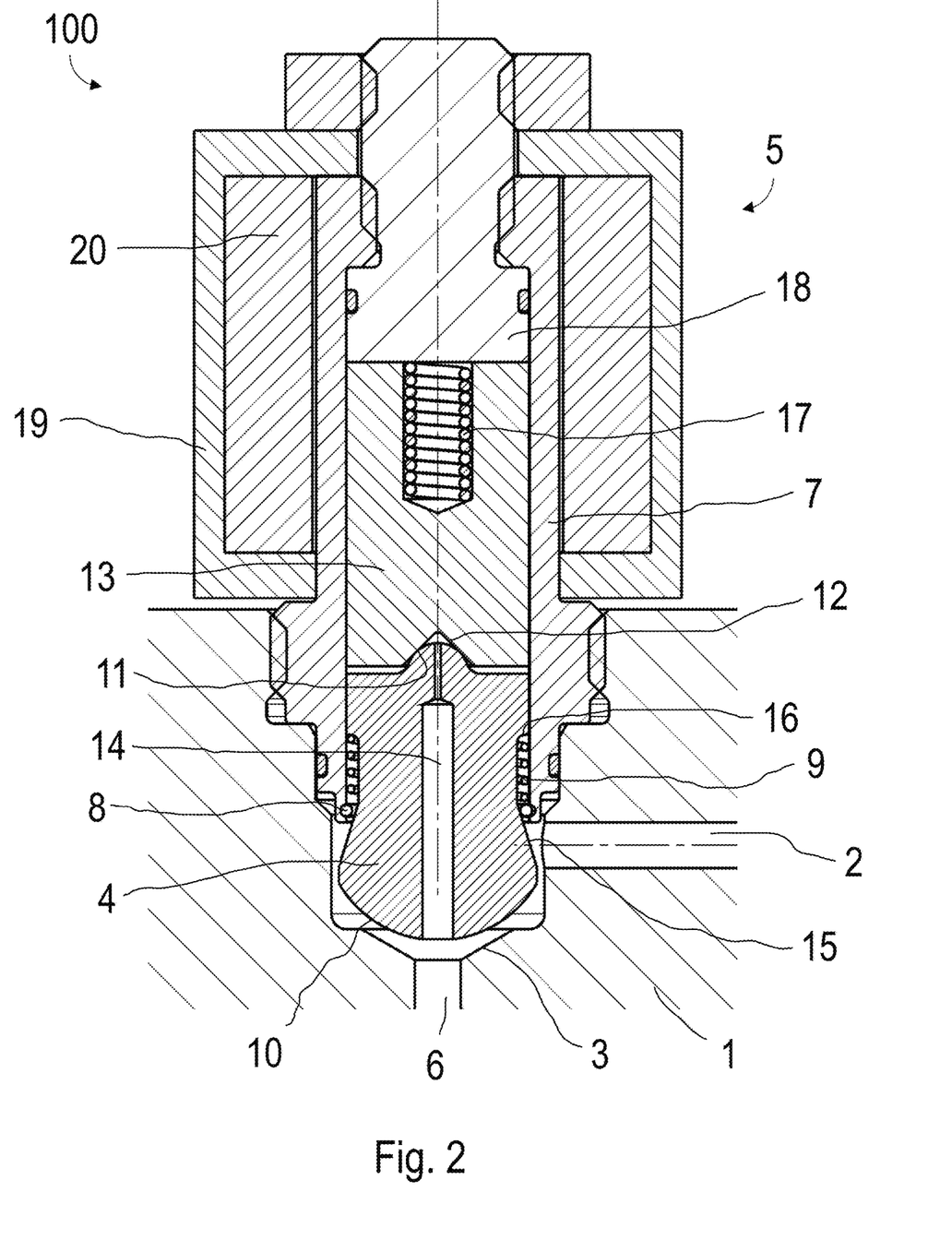
FIG. 2 shows a possible embodiment of the combination valve in the opened state.

When the magnetic coil (20) is energized, the magnetic force pulls the armature (13) in the axial direction against the force of the closing spring (17) toward the antipole (18) and lifts the armature (13) with its sealing surface (12) from the pilot seat (11) of the sealing body (4) until the armature (13) rests against the antipole (18). In this operating state, the pilot seat (11) is opened, gas flows from the inflow (2) via the pilot bore (14) to the outflow (6) and reduces the pressure difference at the sealing body (4) when the removal path is closed downstream. If the difference between the closing force on the sealing body (4) due to the pressure difference on the sealing body (4) and the force of the opening spring (9) is zero, the opening spring (9) lifts the sealing body (4) from the sealing surface (3) in the housing (1) and opens the main seat (10) of the electromagnetic valve (5) according to FIG. 2.

Figure 3:
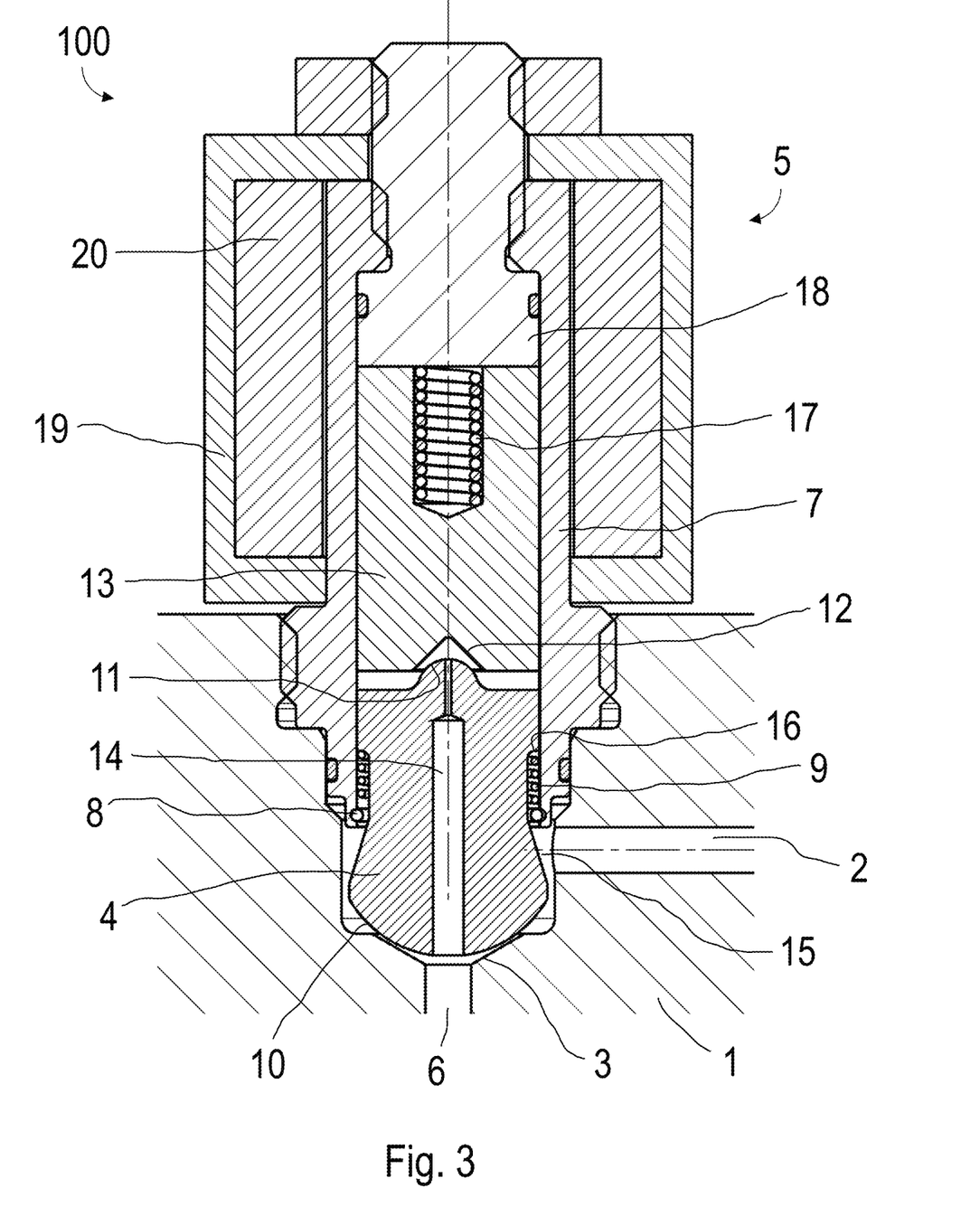
FIG. 3 shows a possible embodiment of the combination valve in the event of a pipe burst just before the closure of the sealing body.

When the valve is opened, the flow around the sealing body (4) causes a pressure drop in the flow direction at the sealing body (4), mainly at the pressure drop area (15) as a flow limiter around which the flow passes, thus generating an axially acting closing force that counteracts the opening force of the opening spring (9) and presses the sealing body (4), according to FIG. 3, in the axial direction toward the sealing surface (3) in the housing (1).

Figure 4:
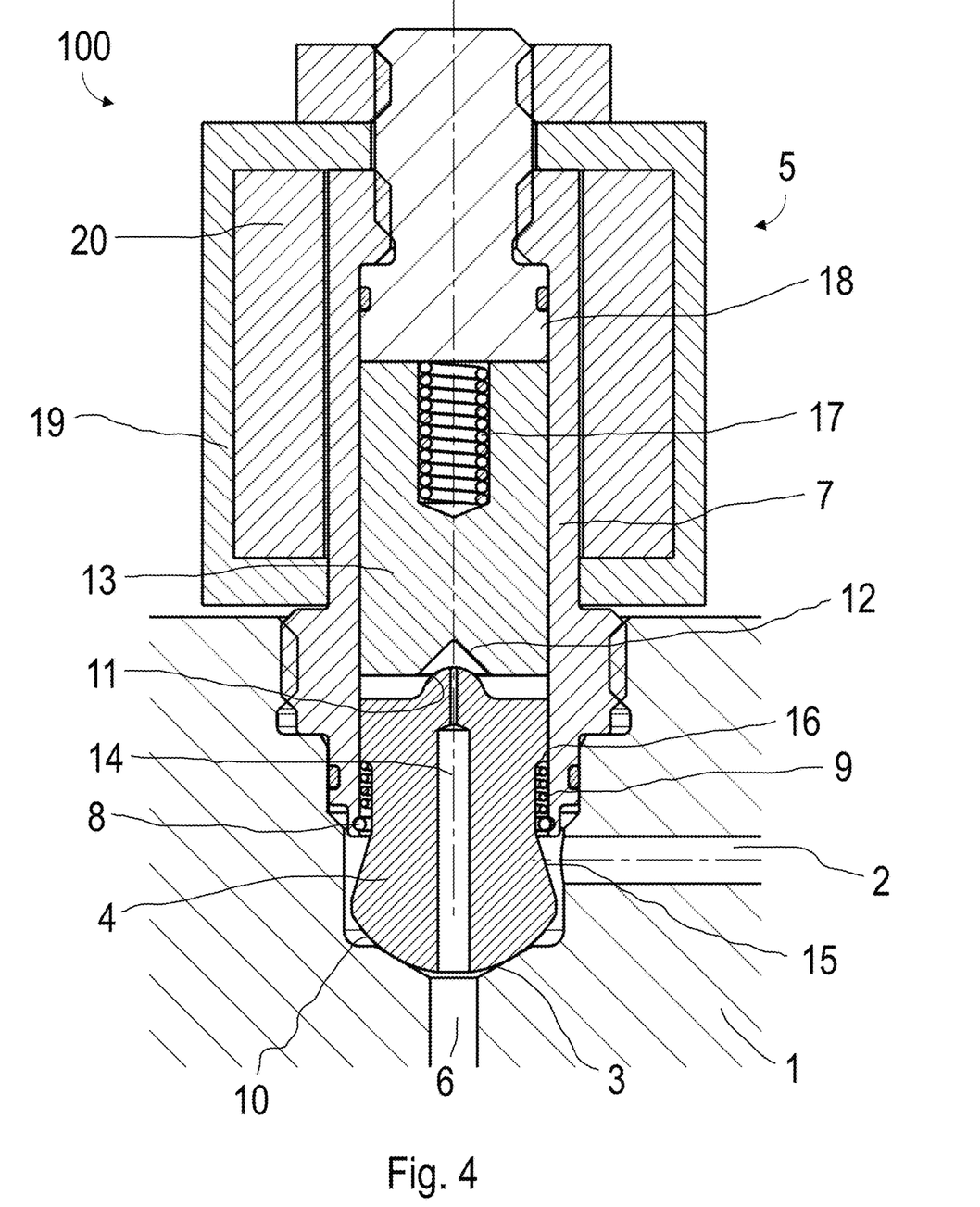
FIG. 4 shows a possible embodiment of the combination valve with a closed sealing body after a pipe burst.

As a result of the reduced distance between the sealing body (4) and the sealing surface (3), the pressure drop in the flow direction continues to increase until the closing force from the differential pressure on the sealing body (4) is greater than the opening force of the opening spring (9), presses the sealing body (4) against the sealing surface (3) in the housing (1) and thus closes the main seat (10) of the electromagnetic shut-off valve according to FIG. 4. In this operating state, the pilot seat (11) remains open for the time being and acts as a reset function for the pipe-break protection. If necessary, the pilot seat (11) of the electromagnetic valve (5) is closed by interrupting the power supply to the magnetic coil (20).

Figure 5:
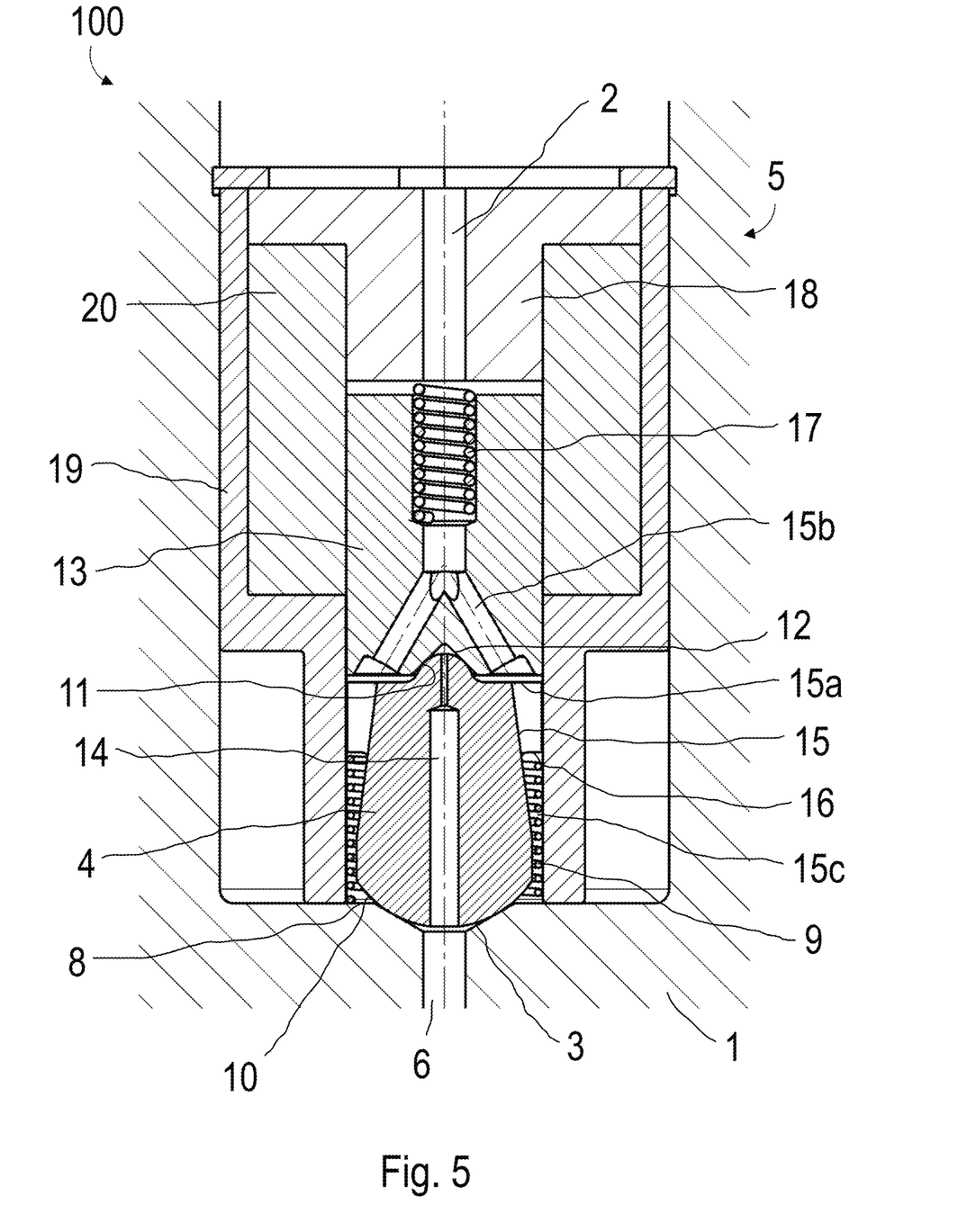
FIG. 5 shows another possible embodiment of the combination valve in the closed state.

FIG. 5 shows another possible embodiment of the combination valve (100) as an inline variant without a pressure-bearing housing in the closed state with an internal flow through the armature (13), the sealing body (4) and the opening spring (9) which is supported on the housing (1).

The pressure drop at the armature (13) is caused by a deflection of the flow when the flow passes through the bores in the armature (13) which act as pressure drop areas (15b). The pressure drop at the sealing element (4) is caused by the flow against the pressure drop area (15a) as a trailing edge of the sealing element (4), by a deflection of the flow when the flow passes through the external grooves of the sealing element (4) which act as pressure drop areas (15), and by a deflection of the flow when the flow passes through or, respectively, around the opening spring (9) which acts as a pressure drop area (15c).

Figure 6:
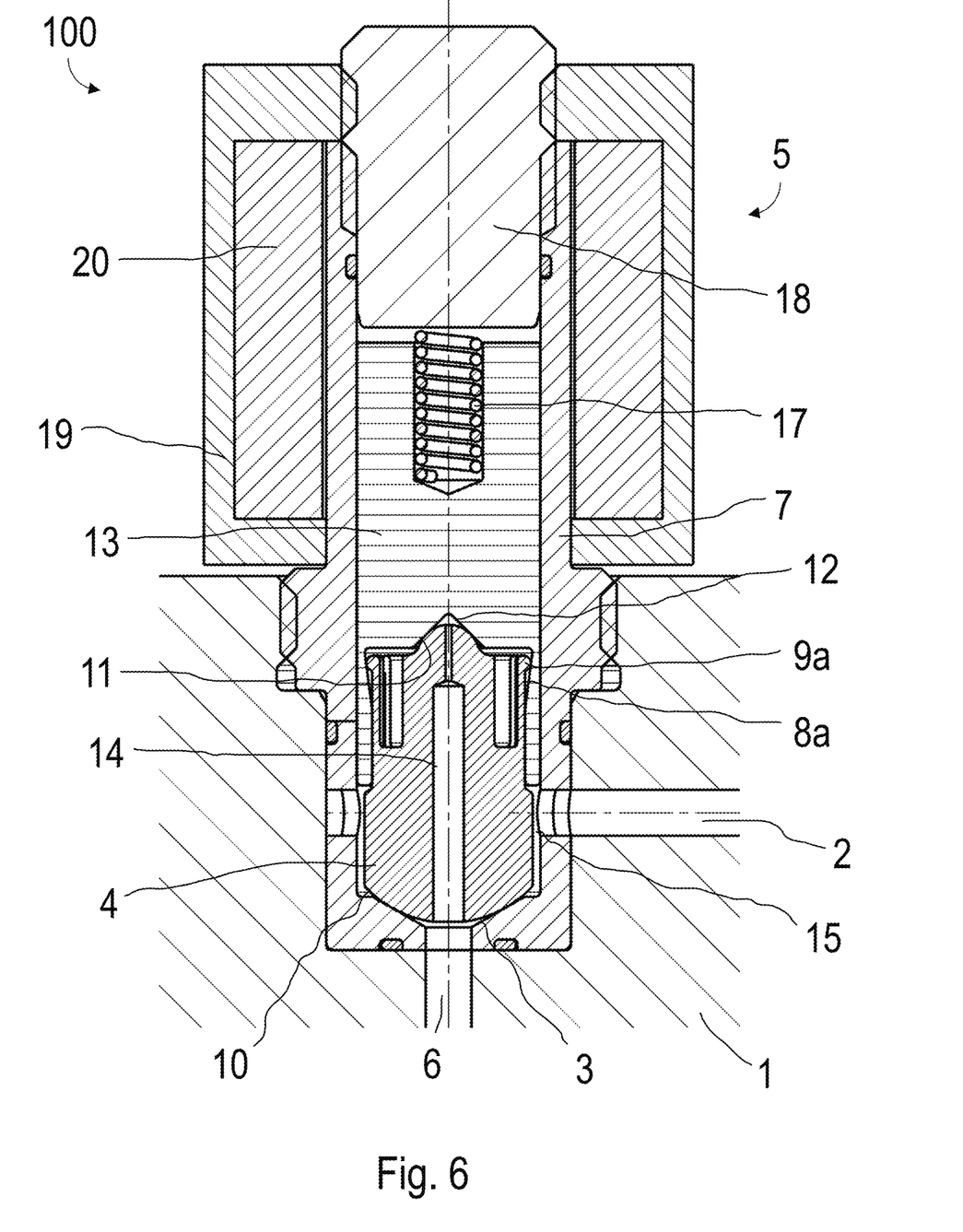
FIG. 6 shows another possible embodiment of the combination valve in the closed state.

FIG. 6 shows another possible embodiment of the combination valve (100) as a screw fitting with a pressure-bearing housing (7) in the closed state, with the housing (7) of the electromagnetic valve (5) sealing against the housing (1) and the sealing body (4) with its main seat (10) sealing against the sealing surface (3) in the housing (7). The sealing body (4) is guided in the armature (13), with resilient sections on the sealing body (4) acting as an opening spring (9a), in cooperation with a conical receiving bore (22) in the armature (13) as a spring support (8a). The gap between the housing (7) and the sealing body (4) forms the pressure drop area (15) for generating the pressure drop, with the flow passing around said area.

There is no mechanical connection between the sealing body (4) and the armature (13), and the sealing body (4) can move in the axial direction according to the prevailing pressure conditions or flow forces, respectively, the force of the opening spring (9) and the state of the magnetic coil (20) (energized or de-energized with the associated position of the armature (13)) and can assume a first end position with the main seat (10) opened and the pilot seat (11) opened at a first flow rate, a second end position with the main seat (10) closed and the pilot seat (11) opened at a second flow rate, a second end position with the main seat (10) closed and the pilot seat (11) closed at a third flow rate and any positions with the associated flow rate between the first and the second end position, depending on the force conditions (the resulting force from the closing force on the sealing body (4) due to the pressure difference on the sealing body (4) and the force of the opening spring (9) on the sealing body (4)). The first flow rate corresponds to the nominal flow of the opened electromagnetic valve (5). The second flow rate is greatly reduced in comparison to the first flow rate, but is high enough for resetting the pipe-break protection when the flow path is closed downstream (reset function), i.e., for equalizing the pressure conditions between the inflow (3) and the outflow (4) via the pilot bore (14) when the flow path is closed downstream and the pilot seat (11) is open as a result of the energized magnetic coil (20) so that the opening spring (9) lifts the sealing body (4) from the housing (1) and reopens the flow path between the inflow (2) and the outflow (6). The third flow rate when the electromagnetic valve (5) is closed is zero.

The closing point of the pipe-break protection is determined by the force of the opening spring (9) and by the design of the flow path between the inflow (2) and the outflow (6) in order to generate the required pressure drop at a defined flow rate. A pressure drop when the flow passes around and/or through the electromagnetic valve (5) or when the flow passes around and/or through individual components of the electromagnetic valve (5) between the inflow (2) and the outflow (6) as a result of a flow deflection and/or flow acceleration is essential for the function of the pipe-break protection, since the axially acting closing force from this differential pressure at a fixed flow rate moves the sealing body (4) and/or other components of the electromagnetic valve (5) against the opening force of the opening spring (9) and, depending on the design, against the magnetic force from the open position into the closed position. The pressure drop required for displacing and/or closing the sealing body (4) occurs as a result of a flow deflection and/or flow acceleration when the flow passes through all encompassing surfaces of the flow path between the inflow (2) and the outflow (6), i.e., the pressure drop for displacing and/or closing the sealing body (4) and/or the armature (13) can be generated optionally by a flow deflection and/or flow acceleration at the pressure drop area (15) on the outside or on grooves of the sealing body (4) and/or the armature (13), with the flow passing around said area, by a flow deflection and/or flow acceleration in bores inside the sealing body (4) and/or the armature (13), by a flow deflection and/or flow acceleration when the flow passes through the opening spring (9), by a flow deflection and/or flow acceleration in the housing (1), e.g., through conical surfaces, by a flow deflection and/or flow acceleration in the housing (7), e.g., through conical surfaces, or by a flow deflection and/or flow acceleration at a component in mechanical and/or fluidic connection with the sealing body (4) and/or the armature (13) and/or the opening spring (9).

If the pressure drop area (15) around which the flow passes is designed on the armature (13), the armature (13) presses the sealing body (4) against the sealing surface (3) in the housing (1) and thus closes the main seat (10) and the pilot seat (11) of the electromagnetic shut-off valve (5) when the closing force from the differential pressure on the armature (13) as a result of the pressure drop on the armature (13) in the flow direction is greater than the opening force resulting from the opening force of the opening spring (9) and the magnetic force between the armature (13) and the antipole (18).

Optionally, the sealing body (4) and/or the armature (13) and/or the housing (7) and other parts of the electromagnetic valve (5) are designed in one or more parts.

The opening spring (9) is optionally arranged between the sealing body (4) and the armature (13) or between the sealing body (4) and the housing (1) or between the sealing body (4) and the housing (7). The opening spring (9) is optionally a spiral spring, a membrane spring, a disc spring or a flexible spring made of a suitable material, a resilient polymer or elastomer component or the like, with a compression spring or a tension spring being possible. Optionally, several opening springs (9) are used. Optionally, the opening spring (9) is protected against a flow passing around or through it.

The opening spring (9) is preferably designed in conjunction with the pressure drop area (15) that has been configured and around which the flow passes, together with the flow path, so that, at a minimum operating pressure, the pipe-break protection is activated at 1.5 times the nominal quantity and closes the sealing body (4) of the electromagnetic shut-off valve (5).

The invention claimed is:

1. A combination valve comprising:
an electromagnetic shut-off valve, the combination valve further comprising an inflow and an outflow, between which a first flow path is defined, a sealing surface arranged in the first flow path, a sealing body movable between an open position and a closed position and comprising a main seat and a pilot seat, between which a pilot bore is defined as a second flow path, a closing spring, an armature with a sealing surface and a magnetic coil, the sealing body being operable to close the first flow path in the closed position by abutting the main seat against the sealing surface arranged in the first flow path, and operable to close the second flow path by abutting the sealing surface of the armature against the pilot seat and being spaced from the sealing surface in the open position of the main seat,
wherein the armature is arranged between the closing spring and the sealing body, and the closing spring is operable to press the sealing surface of the armature against the pilot seat of the sealing body and the main seat of the sealing body against the sealing surface by a spring force, and the magnetic coil is operable to attract the armature against the spring force of the closing spring,
wherein the combination valve comprises an opening spring operable to press the sealing body into the open position by a spring force, the closing spring having a higher spring force than a spring force of the opening spring,
wherein parts of the electromagnetic shut-off valve which are located in the first flow path are operable to generate, when a flow of a medium is present, a flow deflection and/or flow acceleration of a medium flowing therein and, as a result, a pressure drop of the medium from the inflow to the outflow, and the spring force of the opening spring is adjusted so that the pressure drop at a fixed flow rate of the medium in the first flow path pushes the sealing body against the spring force of the opening spring from the open position into the closed position, with the second flow path being opened when the armature is attracted by the magnetic coil.

2. The combination valve according to claim 1, wherein the first flow path runs along the sealing body and through the armature and/or the opening spring.

3. The combination valve according to claim 1, wherein the pilot bore has sections of different respective diameters.

4. The combination valve according to claim 1, wherein a section of the second flow path is formed through a clearance between the sealing body and a housing of the electromagnetic shut-off valve surrounding the sealing body, or through a groove extending on the outside of the sealing body, or through a bore extending inside the sealing body.

5. The combination valve according to claim 1, wherein the sealing body is provided with a pressure drop area which is arranged in the first flow path and around and/or through which the flow passes.

6. The combination valve according to claim 1, wherein the armature is provided with a pressure drop area, and the pressure drop area is arranged in the first flow path so that the flow passes around and/or through the pressure drop area.

7. The combination valve according to claim 1, wherein the opening spring is arranged in the first flow path and is operable to generate a pressure drop.

8. The combination valve according to claim 1, wherein a section of the first flow path is defined by the housing of the electromagnetic shut-off valve and/or by a container valve housing, wherein the section of the first flow path is shaped in such a way that it generates a pressure drop from the inflow to the outflow.

9. The combination valve according to claim 1, wherein the opening spring is an elastic component made of metal, polymer or elastomer or a resilient section on the sealing body.

* * * * *